July 7, 1970 L. H. LAWRENCE 3,519,900
TEMPERATURE COMPENSATED REFERENCE DIODES AND
METHODS FOR MAKING SAME
Filed Nov. 13, 1967 2 Sheets-Sheet 1
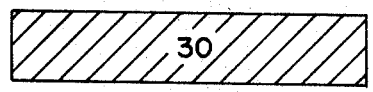
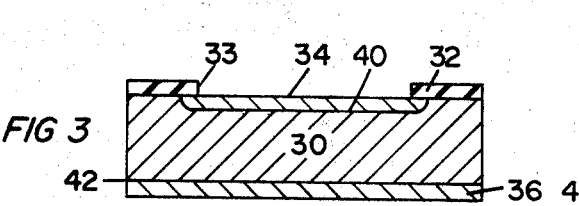
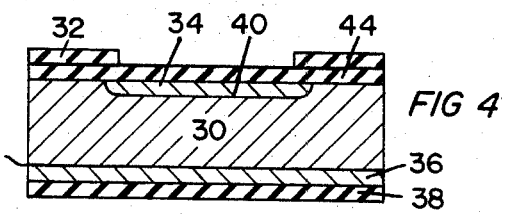
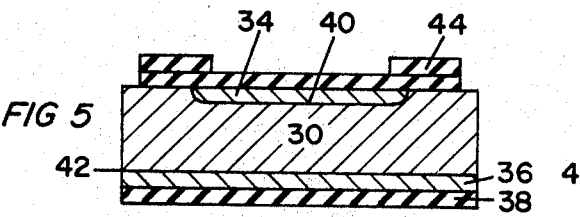
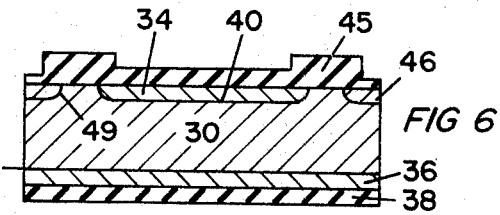
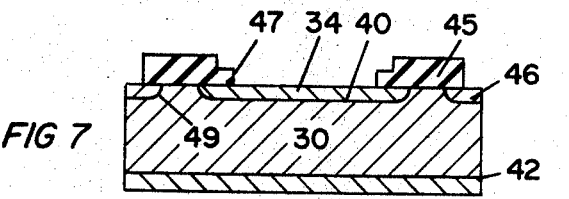
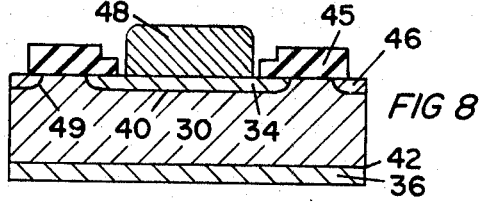
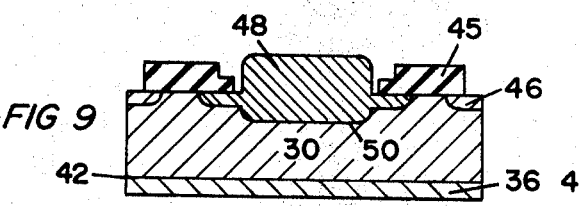
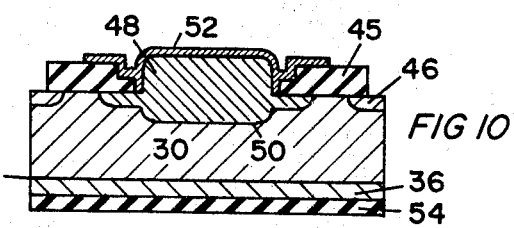
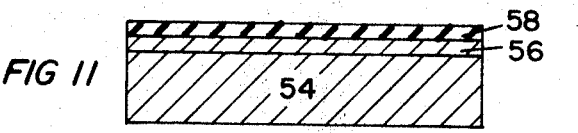
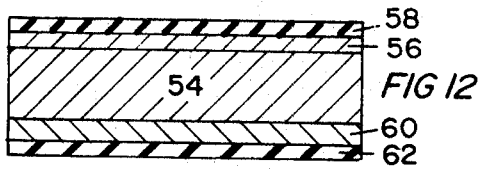
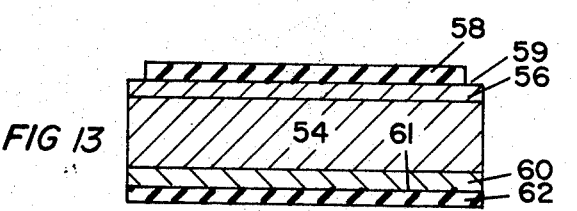
Lamonte H. Lawrence
INVENTOR.
BY
Mueller, Aichele, & Rauner
attys July 7, 1970     L. H. LAWRENCE     3,519,900
TEMPERATURE COMPENSATED REFERENCE DIODES AND
METHODS FOR MAKING SAME Filed Nov. 13, 1967     2 Sheets-Sheet 2

Lamonte H. Lawrence
INVENTOR.

BY
Mueller, Aichele, & Rauner
Atty's

United States Patent Office 3,519,900
Patented July 7, 1970

3,519,900
TEMPERATURE COMPENSATED REFERENCE DIODES AND METHODS FOR MAKING SAME
Lamonte H. Lawrence, Tempe, Ariz., assignor to Motorola, Inc., Franklin Park, Ill., a corporation of Illinois
Filed Nov. 13, 1967, Ser. No. 682,338
Int. Cl. H01l 9/00
U.S. Cl. 317—235                  22 Claims

ABSTRACT OF THE DISCLOSURE

Disclosed is a temperature compensated, alloy junction voltage reference diode and a process for making same. In one embodiment of the invention, the diode is constructed by diffusing an impurity of one conductivity-type semiconductor material into one surface of a wafer to form a forward PN junction therein and alloying a metal into a second surface of the wafer opposing the first surface to form a Zener PN junction of the diode. The formation of the forward and Zener PN junctions by diffusing and alloying into opposing surfaces of the wafer permits excellent control of wafer thickness between these junctions.

Background of the invention

This invention relates generally to voltage reference diodes and more particularly to passivated, alloy junction, temperature compensated reference diodes and methods for making same.

Various types of temperature compensated reference diodes have been used previously, and it is well known to compensate the voltage-temperature characteristic of a reverse biased (Zener) PN junction with that of a forward-biased PN junction.

Among the prior art voltage reference diodes are included those which are constructed with two or more discrete diodes. In these reference diodes, the forward biased PN junction of one discrete diode compensates the reverse biased PN junction of the other diode once the two discrete diodes have been assembled into a single unit. This technique for achieving reference voltage temperature compensation is relatively expensive due to the manufacturing costs involved in packaging two or more discrete diodes in a single unit.

In attempts to reduce the assembly costs involved in combining discrete diodes into a single package, planar type diodes have been constructed using individual process steps which are well known in the semiconductor arts. However, processes used in the fabrication of these devices have relied upon the epitaxial formation of one or more of the device PN junctions and the subsequent passivation of all of the PN junctions with silicon dioxide or the like. The dependence upon epitaxial deposition steps to form the PN junctions of the planar devices is inherently disadvantageous because of various critical conditions which must be met in order to epitaxially deposit a layer of one conductivity-type semiconductor material on another layer of opposite conductivity-type semiconductor material. Additionally, the epitaxial deposition step is costly when compared to other semiconductor processing steps.

Further disadvantages associated with the prior art planar type diode include bulk leakage and surface channeling, i.e., junction shorting, that is frequently caused by leakage currents at the surface and in the bulk of the diodes. The bulk leakage is caused by bulk impurities and increased recombination centers produced by these impurities. Surface channeling is produced by the passivating coating on the diodes which converts the conductivity of a portion of the surface region of the diodes.

Summary of the invention

An object of this invention is to provide new and improved temperature compensated reference diodes and methods for making same.

Another object of this invention is to provide a planar-diffused temperature compensated reference diode in which surface channeling and bulk leakage are satisfactorily controlled.

Another object of this invention is to provide a new and improved process in which epitaxial deposition is not a necessary process step but rather is optional in the construction of a novel, alloy junction reference diode.

A further object of this invention is to provide a temperature compensate reference diode which can be completely passivated and fabricated at a minimum cost. In the alternative, the diode may be only partially passivated for those applications which do not require passivation of the forward biased PN junction or junctions of the diode.

The present invention features a temperature compensated reference diode which is constructed in a monolithic semiconductor chip and includes diffused and alloy PN junctions. Such construction is particularly advantageous in axial lead packages.

Another feature of this invention is the provision of a temperature compensated reference diode for which the zero temperature coefficient point can be easily adjusted by changing the crystal orientation or by changing the substrate resistivity of the diode. The dice used to construct the novel diodes according to this invention may be stacked in a single package for higher levels of reverse breakdown voltage which may be required for certain Zener applications. Additionally, the diodes according to this invention may be marketed in chip form, i.e., with no external package, and there is a considerable market for these diodes in chip form for use in in-house hybrid circuits and systems.

Another feature of this invention is the provision of a "gettering" annular ring in the diode structure which controls bulk current leakage within the structure.

Another feature of this invention is the provision of ohmic contact metallization for the diode which may be connected to a bias potential to reverse bias the diode and reduce surface channeling effects within the diode during Zener operation thereof.

Briefly described, one embodiment of the present invention is directed to a novel, temperature compensated reference diode which is fabricated by simultaneously diffusing an impurity of one conductivity-type semiconductor material into opposing surfaces of a wafer of opposite conductivity-type semiconductor material to form first and second PN junction therein. One of these junctions is operated in a forward direction and the other is operated in a reverse or Zener direction, and the forward biased junction temperature compensates the reverse biased junction. A dielectric coating is formed on at least one surface of the wafer in order to passivate the reverse biased PN Zener junction, and openings are made in the dielectric coating in order to permit the diffusion of an annular ring into the structure. The ring getters impurities in the wafer and decreases bulk leakage therein. Next, a metal is deposited on the wafer and alloyed therein to form an alloy PN junction which is continuous with the first PN junction. Finally, an ohmic contact metallization is applied over the metal and the passivating coating to facilitate electric connections to the diode.

In an alternative embodiment of the invention, only the forward biased PN junction is formed by diffusion, and the reverse biased or Zener junction is formed entirely by alloying.

Brief description of the drawings

FIG. 1 is the wafer or starting material for the process according to this invention;

FIG. 2 illustrates an initial oxide growth or deposition step on one surface of the wafer in FIG. 1;

FIG. 3 illustrates the formation of reverse and forward biased PN junctions in the wafer after an opening has been made in the oxide coating in FIG. 2;

FIG. 4 illustrates a subsequent oxide reformation on the structure in FIG. 3;

FIG. 5 illustrates the selective removal of portions of the oxide on the top surface of the structure in FIG. 4;

FIG. 6 illustrates the annular ring diffusion into the structure of FIG. 5 and the subsequent oxide reformation on the top surface thereof;

FIG. 7 illustrates the selective removal of additional oxide from the structure in FIG. 6;

FIG. 8 illustrates the deposition of a metal on the top surface of the structure in FIG. 7;

FIG. 9 illustrates the step of alloying the metal into the structure of FIG. 8 to form an alloy PN junction; and FIG. 10 illustrates the application of an ohmic contact metallization to the structure in FIG. 9 to facilitate an electrical connection to the diode structure.

FIG. 11 shows a wafer processed in accordance with an alternative embodiment of the invention and includes an epitaxial layer thereon with an oxide coating which was subsequently formed on the epitaxial layer;

FIG. 12 illustrates the diffusion of an impurity into the bottom surface of the structure in FIG. 11 to form the forward biased PN junction of the diode;

FIG. 13 illustrates the selective removal of a portion of the upper oxide coating in FIG. 12;

Description of preferred embodiments

Figure 14:
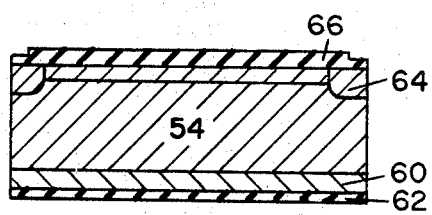
FIG. 14 illustrates the annular rinb diffusion (into or through the epitaxial layer) into the structure in FIG. 13 and the subsequent reoxidation of the upper surface thereof.

Referring in detail to the accompanying drawings, there is shonw in FIG. 1 a semiconductor wafer 30 which is the starting material for the process to be described and may for example be monocrystalline siilcon. For purposes of illustration, assume that the wafer 30 is N type monocrystalline silicon.

In FIG. 2 a dielectric material 32 is formed on the surface of the silicon wafer 30 and may for example be silicon dioxide formed by known oxidation processes. An opening 33 (FIG. 3) is thereafter formed in the oxide layer 32 by cutting or using known photolithographic techniques, and a P type region 34 is formed in the wafer 30 by diffusing a P type impurity such as boron through the exposed upper surface of the wafer 30 to form a planar type PN junction 40. In the same or separate diffusion step, another P type region 36 is formed by diffusing a P type impurity into the lower (opposite) exposed surface of the wafer 30 to form a second PN junction 42. The first PN junction 40 will be referred to herein as the Zener junction since it is operated at reverse breakdown and the second PN junction 42 will be referred to as the forward biased or temperature compensating junction.

In FIG. 4 an oxide layer 44 is reformed on the surface of the wafer 30 and increases the thickness of the remaining portions of the original oxide layer 32. Simultaneously, an oxide layer 38 is formed on the exposed surface of the P type region 36. The oxide forming steps are well known in the semiconductor art and will not be discussed in detail here.

The oxide layer 44 as shown in FIG. 5 is selectively removed to permit an annular ring phosphorus diffusion into the wafer 30 to form a diffused N+ ring 46 as shown in FIG. 6. For NPN structures (not shown) boron can be used as a dopant to form a P+ annular ring in a P type starting wafer. Both during and after the N+ diffusion step, the oxide layer 45 continues to increase its thickness by oxidation of the top surface of the silicon wafer 30. It is well known in the semiconductor art that the step of reoxidizing a semiconductor wafer after portions of an original oxide layer have been removed involves oxidizing the silicon at the surface of the wafer rather than depositing an additional discrete layer on an existing oxide layer.

In FIG. 7 another opening 47 is made in the oxide layer 45 and a metal 48 such as aluminum is deposited on the exposed surface of the P type diffused region 34 in preparation for a subsequent alloying step. The structure in FIG. 8 is heated to an elevated alloying temperature so that the P type metal 48 and the silicon wafer are alloyed to extend the first or Zener PN junction 50 as shown in FIG. 9. This alloying step may be carried out at temperatures ranging from 577° C. (eutectic temperature) to as much as 1300° C. A typical alloying cycle would involve initially depositing the metal at a thickness from between 60,000–100,000 Angstroms, subsequently heating for less than a minute at temperatures between 800° C.–1100° C. and then allowing the structure to slowly cool to relieve any strain imposed on the lattice structure of the diode by heating. Silver has been used as the metal alloy and covered with a layer of gold (not shown) to prevent the silver from oxidizing.

Next, an ohmic contact metallization 52 forming a first diode electrode is deposited over the metal 48 and over the oxide coating 44 as shown in FIG. 10. The metallization 52 may be deposited by the evaporation of a composition of chromium, silver and/or gold and the relative amounts of these compositions are not critical. In the alternative, pure gold or silver may be used. Another layer of ohmic contact metallization 54 is formed on the surface of the P type region 36 simultaneously with layer 54 and is a second diode electrode connection.

The N+ band or ring 46 which is formed by the above described diffusion step getters the P type impurity in the wafer 30 in the vicinity of the PN junction 50. This gettering action reduces the bulk current leakage in the region 30 and increases the carrier lifetimes in the vicinity of the PN junction 50. The temperature coefficient (TC) of the diode is a function of carrier lifetimes and over some temperature ranges, e.g., 100° C. to 150° C. The control of carrier lifetimes is critical in order to control the reverse leakage current, IR and hence the TC of the diodes.

For NPN diode structures, the P+ annular ring formed for example by diffusing boron into a P type starting wafer not only getters the impurities in the vicinity of the Zener junction but also prevents any surface channeling which tends to be caused by the SiO₂ layer on the surface of the diode structure.

The ohmic contact metallization 52 which forms one electrode of the diode extends over and the silicon dioxide layer 45 is biased negatively and attracts positive ions to the upper surface of layer 45. Such ion attraction virtually depletes the lower regions of the SiO$_2$ layer 45 of positive ions and tends to prevent channeling in region 30.

In operation, the second or forward biased PN junction 42 has a positive temperature coefficient of voltage whereas the first or Zener PN junction 50 has a negative temperature coefficient of voltage. The PN junction 42 temperature compensates for the Zener junction 50 over a temperature range for example between −55° C. to +150° C. The voltage between top electrode 52 and the bottom electrode 54 can be maintained substantially constant over the above exemplary temperature range by equally and oppositely offsetting one PN junction temperature coefficient (TC) with the other TC to provide a OTC device. On the other hand, the overall temperature coefficient of the structure in FIG. 10, i.e., the combined temperature coefficients of the forward and Zener PN junctions, can be adjusted by either changing the crystal orientation or the resistivity of the silicon wafer 30. It is also important to control the impurity concentration in these diodes and hence the carrier lifetimes by first gettering a substantial amount of impurity in the vicinity of the Zener junction as previously described and then selectivity doping the diode structure with a dopant such as gold to achieve proper lifetime control.

The oxide coating 45 shown in FIG. 10 passivates the first or Zener PN junction at its point or surface termination and imparts a desired stable electrical characteristic to the diode structure.

In an alternative embodiment of the invention, an epitaxial layer 56 is deposited on a monocrystalline silicon wafer 54 as illustrated in FIG. 11, and the epitaxial layer 56 is of the same conductivity type as the substrate 54 but of a higher resistivity. The high resistivity epitaxial layer 56 forces Zener junction breakdown to occur in the bulk of the diode rather than at its surface to thereby insure a sharp junction breakover which is not affected by surface properties of the device. If desired, an additional epitaxial layer (not shown) may be grown between layers 54 and 56 to achieve a greater degree of control of resistivity of the diode strucure. An oxide layer 58 of SiO$_2$ is formed on the epitaxial layer 56.

In FIG. 12 a region 60 of opposite conductivity type semiconductor material is diffused into the lower surface of the wafer 54, and layer 60 forms a PN junction as shown. Dielectric layer 62 of silicon dioxide is formed on the exposed surface of region 60, and the oxide layer 58 is removed as indicated at 59 (FIG. 13) to permit a subsequent diffusion of the annular ring 64 as shown in FIG. 14. The ring diffusion 64 extends into or through the epitaxial layer 56 and into the silicon wafer 54 as shown.

Figure 15:
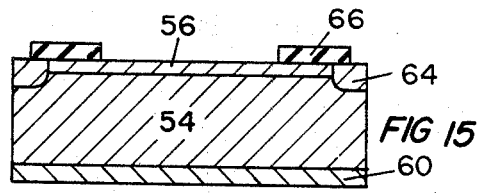
FIG. 15 illustrates the selective removal of the upper oxide coating in FIG. 14.
Figure 16:
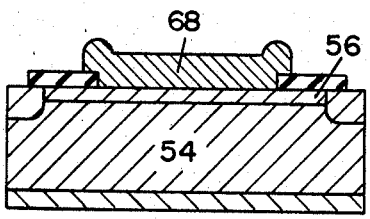
FIG. 16 illustrates the deposition of a metal on the exposed surface of the epitaxial layer in FIG. 15.
Figure 17:
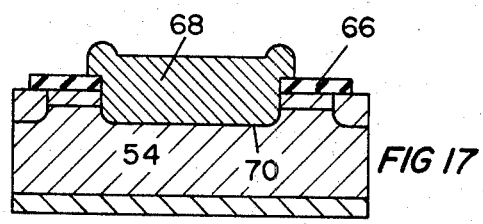
FIG. 17 illustrates the formation of the Zener PN junction in the structure of FIG. 16 by alloying the metal through the epitaxial layer.

In FIG. 15 the oxide layer 66 is selectively etched in preparation for a subsequent metal alloy step. A metal 68 such as aluminum is deposited on the exposed surface of the N type epitaxial layer 56 in FIG. 16, and the structure in FIG. 16 is heated to an elevated alloying temperature to cause metal 68 to alloy through the epitaxial layer 56 and into the body of the wafer 54 to form the alloy PN junction 70 as shown in FIG. 17.

Figure 18:
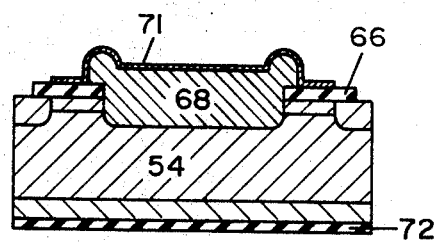
FIG. 18 illustrates the application of an ohmic contact metallization over the upper metal and oxide surfaces and over the lower surface of the structure in FIG. 17.

In FIG. 18, layers of ohmic contact metallization 71 and 72 are deposited on the upper and lower surfaces of the structure in FIG. 17 in a manner similar to that described with reference to FIG. 10.

The embodiment of the invention illustrated in FIGS. 11–18 has fewer processing steps than the embodiment illustrated in FIGS. 1–10. In FIGS. 11–18 there is no diffusion of the Zener junction, and where an N+ layer is to be grown on a P type substrate, the process illustrated in FIGS. 11–18 would be the least expensive of the two processes. However, the process illustrated in FIGS. 1–10 requires no epitaxial growth step and provides a device, i.e., FIG. 10, electrically equivalent to FIG. 18 without this epitaxial step.

Figure 19:
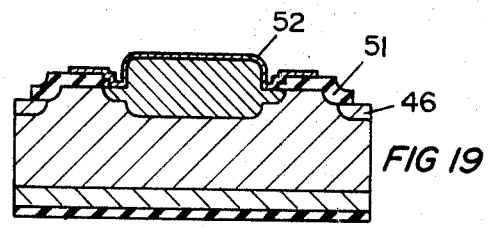
FIGS. 19 and 20 illustrate two additional embodiments of the invention wherein the Zener junction is elevated on a mesa to facilitate soldering of series stacks without shorting the Zener PN junction.

The diode structure in FIG. 19 is a mesa etched variation of the structure shown in FIG. 10 and includes an etched portion 51 thereof. The etched geometry of FIG. 19 can be constructed by well known masking and etching techniques, the process details of which will not be described here. The structure of FIG. 19 is particularly useful when it is desired to stack diodes by soldering the metallization 52 to another similar diode electrode. By etching out region 51 prior to diffusing the N type ring 46 into the structure, the N type ring 46 can be further removed from the ohmic contact metallization 52 to thereby insure that a short circuit will not occur between the N type ring 46 and the metallization 52 when the latter is soldered in a diode stack.

Figure 20:
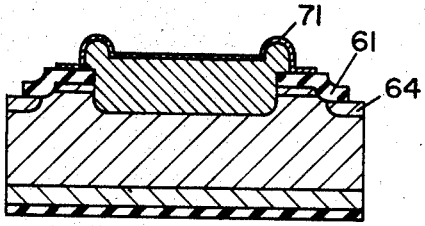

The diode structure in FIG. 20 is a mesa etched variation of the diode structure of FIG. 18 previously described. By etching the structure at region 61 prior to diffusing the N type annular ring to the structure, the diffused ring 64 can be further removed from the contact metallization 71 than it is in the structure shown in FIG. 18. Thus, when stacking diodes by soldering the metallization 71 to another similar diode, an electrode short circuit between the metallization 71 and the N type annular ring 64 will not likely occur as previously described.

Figure 21:
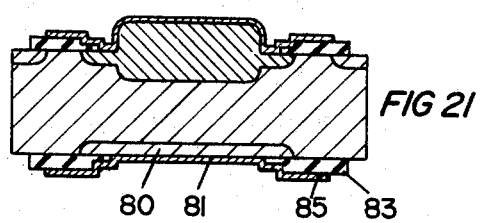
FIGS. 21 and 22 illustrate further embodiments of the invention wherein the structures of FIGS. 10 and 18 respectively have been completely passivated.

FIG. 21 illustrates an all-passivated diode structure which differs from the structure in FIG. 10 in that the forward biased or temperature compensating PN junction 81 is a planar type junction which is passivated with a silicon dioxide coating 83. An ohmic contact metallization 85 is deposited over the silicon dioxide coating 83 on the surface of the P type region 80.

Figure 22:
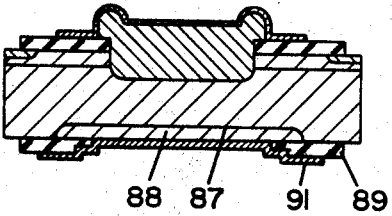

FIG. 22 illustrates the all passivated variation of the structure shown in FIG. 18 and includes a planar type PN junction 87 which is passivated with a silicon dioxide coating 89. An ohmic contact metallization layer 91 is deposited on the silicon dioxide coating 89 and on the surface of the P type region 88.

Figure 23:
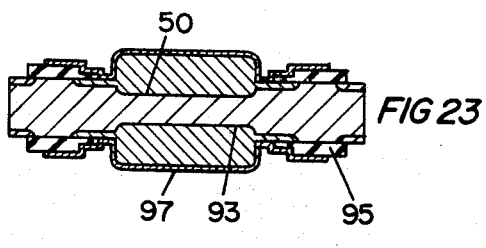
FIG. 23 illustrates another embodiment of the invention wherein all PN junctions of the diode are passivated and all electrical contacts and alloy regions have been formed so that the structure is completely symmetrical.

FIG. 23 is a symmetrical variation of the structure shown in FIG. 10 and both the Zener junction 50 and the forward biased or temperature compensating junction 93 are formed by alloying in a manner identical to that described with reference to the formation of the Zener junction 50 in FIG. 10. The forward biased or temperature compensating junction 93 is passivated with a silicon dioxide coating 95 at the lower surface of the diode, and an ohmic contact metallization 97 is applied thereover in a manner previously described. The symmetrical variation of FIG. 18 (not shown) is similar to the structure in FIG. 23 and includes the epitaxial layer 56 as previously described with reference to the process illustrated in FIGS. 11–18.

Figure 24:
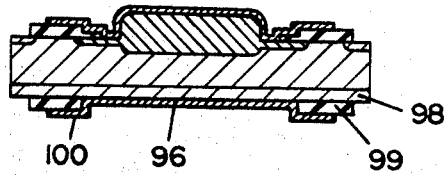
FIG. 24 illustrates an embodiment of the invention wherein the compensating or forward biased PN junction is a surface barrier (or Shottky Barrier) junction.

FIG. 24 illustrates yet another embodiment of the invention wherein the temperature compensating or forward biased PN junction 96 of the device is a surface barrier or Shottky barrier junction. The junction 96 is a rectifying junction formed by joining a metal such as aluminum layer 100 in intimate and integral contact with the lower surface of the wafer 30. Chromium or molybdenum may also be used for the layer 100 in place of aluminum if desired. An oxide coating 99 may be formed on the lower surface of the N type wafer 30 in a known manner to passivate the junction 96. A higher resistivity N type epitaxial layer 98 may be grown on the lower surface of the wafer 30 prior to the application of the oxide 99 and a layer of metal 100 thereto as previously described. The epitaxial layer 98 makes a higher voltage device than would be the case without this layer.

In summary, the processes and devices according to this invention require no expensive or critical epitaxial deposition steps, but these epitaxial steps can be utilized for flexibility if desired. In the first alternate embodiment of the invention illustrated in FIGS. 11 through 18, the Zener junction is formed entirely by alloying, and the epitaxial step in this proces is relatively noncritical since the resistivity of the epitaxial layer must only be greater than that of the starting wafer 30.

In two additional embodiments of the invention illustrated respectively in FIGS. 19 and 20, the Zener junction is elevated on a mesa to facilitate the soldering of series stacks of these diodes without shorting between the upper electrode and the annular N type ring.

Additional embodiments of the invention illustrated in FIGS. 22 and 23 are directed to variations of the structures in FIG. 10 and 18 respectively in which the structures are all passivated for higher reliability and stability without a substantial cost increase over the previously described processes.

The symmetrical geometry of the structure in FIG. 23 makes it convenient to use this structure alternately as a diode clipper and such geometry requires no orientation in packaging.

Finally, the Shottky or surface barrier diode in FIG. 24 illustrates that the present invention may be constructed without diffusing a lower P type region to form a compensating or forward biased junction. The elimination of this diffusion step may be desirable for certain Zener diode applications, especially where lower Zener voltages are required with close control of compensation.

Many modifications can be made in the above described processes and diode structures without departing from the scope of this invention. For example, one or more epitaxial layers may be deposited on one or both major surfaces of the starting wafer 30 prior to the above described steps in the above processes to enable finer control over the resistivity of the diode structure. Accordingly, the above described processes modified by such epitaxial growth steps and other similar process steps are deemed within the scope of the present invention as defined in the following appended claims.

I claim:

1. A process for fabricating a temperature compensated reference voltage diode including the steps of:
   diffusing an impurity of one conductivity-type semiconductor material into one surface of a semiconductor wafer to form a forward PN junction therein,
   alloying a metal into a second surface of said wafer opposing said first surface to form a second, Zener PN junction in said wafer, the formation of said PN junctions in said wafer by diffusing and alloying, respectively, into opposing surfaces of said wafer permitting excellent control of wafer thickness between said forward and Zener PN junctions, and
   diffusing a ring of gettering material into said second surface of said wafer and surrounding but spaced from said alloyed metal.

2. The process according to claim 1 which further includes
   forming a dielectric coating on said wafer,
   forming an opening in said dielectric coating to enable a subsequent impurity diffusion into said wafer,
   diffusing an impurity of said one conductivity type into said second surface of said wafer prior to said alloying to form a portion of said Zener junction,
   reforming a dielectric coating on said wafer,
   selectively removing portions thereof to permit a subsequent annular ring diffusion into said wafer,
   said ring of gettering material being of said one conductivity type and in which said ring of gettering material getters impurities within said wafer to thereby increase carrier lifetime in said wafer and control level of bulk recombination centers in said diode,
   selectively removing another portion of said dielectric coating to form an opening therein,
   depositing said metal on said wafer and in contact with said second surface thereof in preparation for said alloying, and
   forming a layer of ohmic contact metallization over said metal and over said portions of the dielectric coating remaining in said wafer to provide electrical contact for said diode.

3. The process according to claim 1 which further includes the steps of
   forming a high resistivity epitaxial layer of opposite conductivity-type semiconductor material on said wafer,
   forming a dielectric coating on said epitaxial layer,
   selectively removing portions of said dielectric coating to permit a subsequent ring diffusion into said wafer,
   said ring of gettering material being of said opposite conductivity type and in which said ring of gettering material getters impurities within said wafer to thereby reduce bulk current leakage in said diode,
   selectively removing other portions of said dielectric coating to permit said metal alloying,
   depositing said metal on said epitaxial layer to permit alloying said metal through said epitaxial layer to form said alloy Zener junction for said diode, and
   applying an ohmic contact metallization over said metal in contact with portions of said dielectric material on the surface of said diode to provide an electrical contact thereto.

4. The process according to claim 1 which further includes
   selectively diffusing an impurity of said one conductivity-type semiconductor material into said wafer to form a diffused region adjacent said second surface which defines a portion of said Zener junction,
   selectively depositing a metal on the second surface of said wafer,
   alloying said metal into said wafer and through said diffused region adjacent said second surface to form said alloy Zener junction which further extends the junction defined by said last named diffused region and is continuous therewith, and
   applying a contact metallization to said metal to provide electrical contact thereto.

5. The process according to claim 1 which further includes diffusing an impurity of one conductivity-type semiconductor material into said second surface of said semiconductor material prior to alloying said metal therein to form a diffused PN junction which is continuous with said alloy junction to form the Zener PN junction for said diode.

6. The process according to claim 1 which further includes
   applying a dielectric coating to at least one surface of said wafer to passivate said Zener PN junction at its point of surface determination, and
   applying an ohmic contact metallization over said dielectric coating and in contact with said metal to provide good electrical contact to said diode.

7. A temperature compensated reference diode including, in combination:
   a semiconductor wafer having a first region of one conductivity-type semisconductor material diffused through and adjacent to a first major surface of said wafer to form a forward diffused PN junction therein,
   a second region of said one conductivity type formed by a metal alloyed through and adjacent to a second major face of said wafer and defining an alloy Zener junction for said diode, said forward diffused PN junction temperature compensating said Zener junction when said diode is biased into conduction, and
   a ring of gettering material in said second surface of said wafer surrounding but spaced from said alloy Zener junction.

8. The structure defined in claim 7 which further includes
a dielectric coating on said second major surface of said wafer for passivating said Zener junction at its point of surface termination, and
ohmic contact means extending over said dielectric coating and into electrical contact with said second region for providing electrical contact thereto.

9. The diode structure defined in claim 7 which further includes
a third region of said one conductivity-type semiconductor material diffused in to said wafer through said second major surface and adjacent thereto to define portions of said Zener junction, said first region being alloyed through said third region to form a continuous Zener junction which is partially diffused and partially alloyed.

10. The diode structure as defined in claim 7 which further includes
a third, epitaxial region of opposite conductivity-type semiconductor material formed adjacent said second major surface of said wafer and of higher resistivity semiconductor material than said wafer, and said first region formed through said epitaxial region to completely form said Zener junction.

11. The diode structure as defined in claim 10 in which said ring is of opposite conductivity-type semiconductor material adjacent said second major face of said wafer and extends through said third, epitaxial region, said ring being of relatively low resistivity semiconductor material for gettering impurities within sad wafer and increasing the carrier lifetimes in regions adjacent said Zener junction.

12. The diode structure as defined in claim 9 in which said ring is of opposite conducivity-type semiconductor material adjacent said second major surface of said wafer and of a relativety low resistivity semiconductor material for gettering impurities in said wafer in regions adjacent said Zener PN junction and thereby increasing the carrier lifetimes in the vicinity of said Zener junction.

13. The diode structure as defined in claim 11 which further includes
a dielectric coating on said second major surface of said wafer and extending over said Zener PN junction to passivate same, and
an ohmic contact metallization extending over said dielectric coating and into contact with said metal for providing electrical contact to said first region.

14. The diode structure defined in claim 12 which further includes
a dielectric coating on said second major surface of said wafer and extending over said Zener PN junction to passivate same, and
an ohmic contact metallization extending over said dielectric coating and into ohmic contact with said metal for providing good electrical contact so said first region.

15. The diode structure as defined in claim 14 wherein said ring is removed from said ohmic contact metallization by an etced out portion of said wafer underlying said dielectric coating.

16. The diode structure as defined in claim 13 wherein said ring is removed from said ohmic contact metallization by an etched out portion of said wafer underlying said dielectric coating.

17. The diode structure as defined in claim 14 wherein said first region of said one conductivity-type semiconductor material defines said forward PN junction which terminates at said first major surface of said wafer, said structure further including
a dielectric coating on said first major surface extending over said forward PN junction for passivating same, and
an ohmic contact metallization overlying said last named dielectric coating and in ohmic electrical contact with said first region.

18. The diode structure as defined in claim 13 wherein said forward PN junction defined by said first region extending to said first major surface of said wafer, said structure further including
a dielectric coating on said first major surface of said wafer and extending over said forward PN junction at its point of surface termination, and
an ohmic contact metallization overlying said last named dielectric coating and in ohmic electrical contact with said first region.

19. The diode structure defined in claim 17 which further includes an additional region of said one conductivity-type semiconductor material extending through said first region and formed by a metal alloyed through said first major surface of said wafer to further extend said forward PN junction into said wafer in the direction of said Zener PN junction, whereby said forward and Zener PN junctions of said diode are both partially formed by alloying metals respectively through said first and second major surfaces of said wafer.

20. A temperature compensated reference diode, including, in combination:
a semiconductor wafer having a region of one conductivity-type semiconductor material defined by a metal alloyed through one major surface thereof and defining a Zener PN junction of said diode,
a metal electrode of said one conductivity-type affixed to another surface of said wafter opposing said first surface and defining a surface barrier PN junction at said another surface, whereby said surface barrier junction is forward biased and temperature compensates said Zener junction when said diode is conducting, and
a ring of gettering material in said second surface of said wafer surrounding but spaced from said alloy Zener junction.

21. The diode structure defined in claim 20 which further includes
a dielectric coating on said another surface of said wafer for passivating said surface barrier PN junction, and
said metal electrode being part of an ohmic contact metallization overlying said dielectric coating and extending into ohmic electrical contact with said wafer at said surface barrier PN junction of said diode.

22. The diode structure as defined in claim 21 which further includes
a third region of said one conductivity-type semiconductor material diffused into said wafer and through said one major surface and adjacent thereto to define portions of said Zener junction, said first region being alloyed through said third region to form a continuous Zener junction which is partially diffused and partially alloyed,
said ring of gettering material being of said opposite conductivity-type semiconductor material and being of relatively low resistivity semiconductive material for gettering impurities in said wafer in the region adjacent said Zener PN junction and thereby reducing the carrier lifetimes into the vicinity of the Zener junction,
a dielectric coating on said one major surface of said wafer and extending over said Zener PN junction to passivate same, and
an ohmic contact metallization extending over said last named dielectric coating and into ohmic electrical contact with said alloyed metal for providing good electrical contact to said diode.

(References on following page)

References Cited

UNITED STATES PATENTS

| | | | |
|---|---|---|---|
| 2,937,963 | 5/1960 | Pelfrey | 148—33 |
| 3,293,010 | 12/1966 | Hackley | 29—195 |
| 3,309,241 | 3/1967 | Dickson | 317—235 X |
| 3,338,758 | 8/1967 | Tremere | 148—33.5 |
| 3,341,377 | 9/1967 | Wacker | 148—177 |
| 3,410,735 | 11/1968 | Hackley | 148—180 |

FOREIGN PATENTS 1,372,145  8/1964  France.

OTHER REFERENCES

IBM Technical Disclosure Bulletin, Passivation of Alloy Junctions, by T. G. Stehney, vol. 5, No. 8, January 1963, p. 94.

JOHN W. HUCKERT, Primary Examiner

R. F. POLISSACK, Assistant Examiner

U.S. Cl. X.R.

29—573, 585; 317—234